S. B. COX.
Kettle Lid.
No. 67,847.
Patented Aug. 20, 1867.
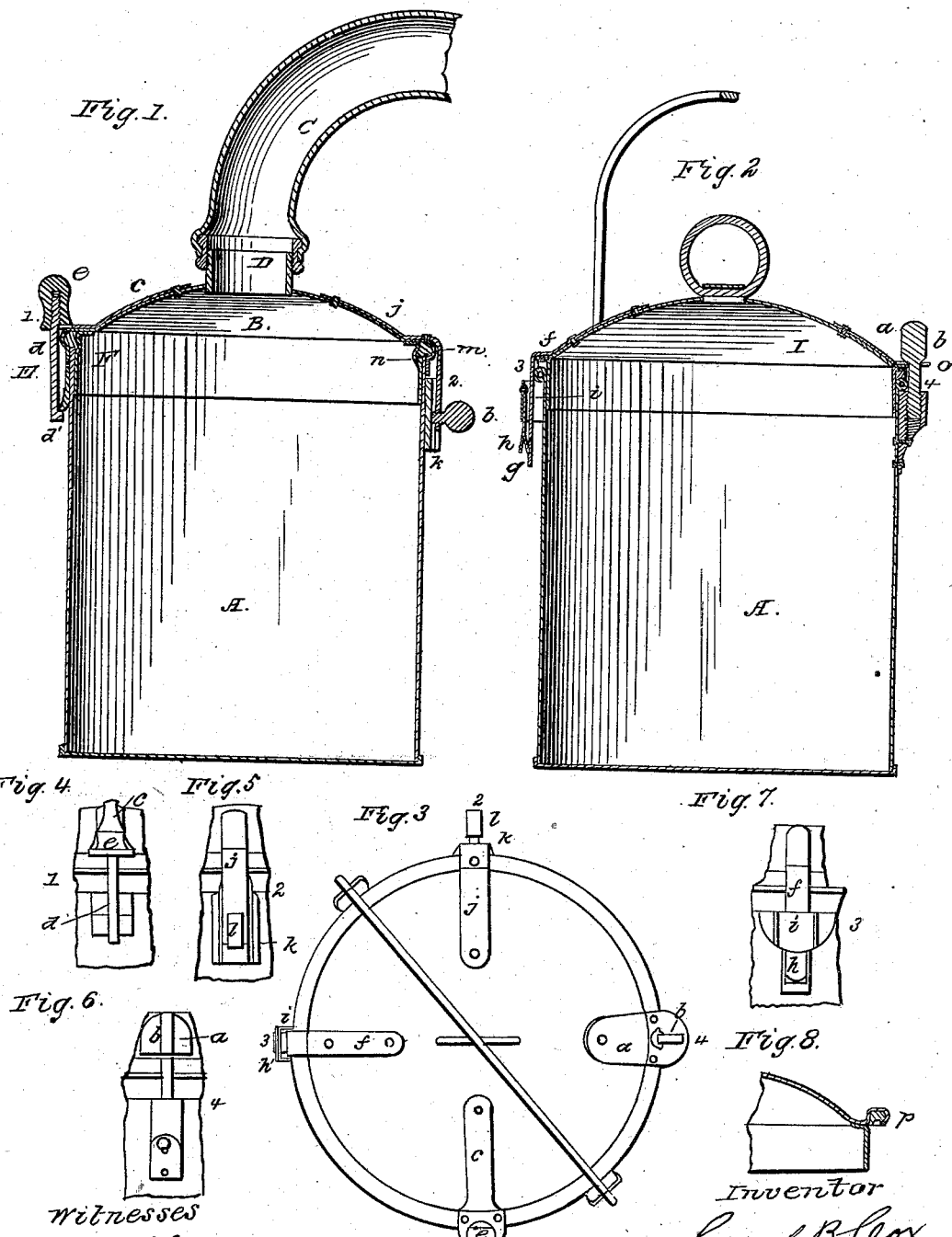
Witnesses
R. H. Seaton
A. Markham
Inventor
Samuel B. Cox
By How & Weston
Attys

United States Patent Office.

SAMUEL B. COX, OF BUFFALO, NEW YORK.

Letters Patent No. 67,847, dated August 20, 1867.

---

IMPROVEMENT IN LIDS FOR KETTLES, PAILS, &c.

---

*The Schedule referred to in these Letters Patent and making part of the same.*

---

TO ALL WHOM IT MAY CONCERN:

Be it known that I, SAMUEL B. COX, of Buffalo, in the county of Erie, and State of New York, have invented certain new and useful Improvements in Lids for Pails, Kettles, &c.; and I do hereby declare that the following is a full, clear, and exact description thereof, reference being had to the accompanying drawings, and to the letters of reference marked thereon.

My invention relates to certain means for fastening on the lids or covers of kettles, pots, or pails, and of rendering them tight, thus preventing the escape of their contents; and also of conducting away the vapors arising from cooking and boiling liquids, so that they shall not be wasted nor allowed to escape into the room.

It consists of an India-rubber ring, having a groove in its lower side to admit the edge of the vessel, the said ring being put on at the upper and outer corner of the lid or cover, and just below, or embedded in the horizontal lip or flange, which regulates the distance to which the vertical flange on said cover or lid descends into the said vessel, the said rubber ring being used in combination with certain fastenings which secure the lid or cover in its place, substantially as hereinafter specified. Also, in the combination with the said grooved rubber ring and fastenings of a flexible rubber pipe, secured to the said lid or cover by a screw joint, for conducting away the steam or other vapors generated in culinary or other operations, whereby they may be discharged into the chimney, or, if desired, into another vessel, to be used again. In the accompanying drawings—

Figure 1 is a cross-section of a metallic vessel arranged for cooking or for boiling liquids, and having my improved ring, fasteners, and conductor pipe attached thereto.

Figure 2 is a cross-section of a similar vessel, designed for carrying liquids, but not having the conductor-pipe attachment.

Figure 3 is a top view of a cover similar to that shown in fig. 2, exhibiting four different kinds of fastenings for securing said cover to the vessel.

Figures 4, 5, 6, and 7 are side elevations of the fasteners shown in fig. 3.

Figure 8 is a detail section of a portion of a cover, showing a variation in the manner of attaching the rubber ring to the cover.

A is the vessel for containing the liquid. B is a cover adapted to be used on a vessel for boiling or cooking liquids, and having a flexible India-rubber pipe, C, secured to it by a screw-joint, D, as clearly seen in fig. 1. In or attached to the cover B is an India-rubber ring, E, with a groove, F, in its lower side, into which the upper edge of the walls of the vessel A are forced, and held by the operation of the fasteners 1 and 2, thus making a tight joint when the cover is on. I is a lid, having no pipe connection, but in other respects similar to the cover B shown in fig. 1. There are four different kinds of fastenings shown in the drawings, marked Nos. 1, 2, 3, and 4, the construction of each of which is clearly exhibited. In practice, I prefer to use that shown in No. 4, as it is simple, cheap, and effective. It consists of a lip or bearing, $a$, riveted or soldered to the cover, through and bearing against which is a thumb-screw, $b$, which works in a nut riveted or bolted to the side of the vessel. By this fastener, as well as by the fasteners Nos. 1 and 3, any required amount of pressure may be exerted in forcing the cover down tightly. Fastener No. 1 consists of a lip or bearing, $c$, a screw-bolt, $d$, hooking under the projecting corner of a piece, $d'$, which is riveted or soldered to the vessel, and being drawn up firmly by the nut $e$. No. 2 consists of a similar bent piece, $j$, sliding in a dove-tail opening in a fixed piece, K. No. 3 consists of a bent strip of metal, $f$, riveted at its upper end to the cover, the lower end being bent down parallel to the sides of the vessel, and having a rack, $g$, formed on its outer side, into which the spring-pawl $h$, which is fastened to the loop $i$, takes. But two of either of these fasteners are required—one on each side of the vessel. There are also three different ways of attaching the India-rubber ring to the cover: that in fig. 1, which consists in setting the said ring into a recess made by bending the lip or flange $m$ downward, and slightly grooving the vertical flange $n$ of the cover; that shown in fig. 2, which consists in simply putting on the ring below the horizontal lip $o$; and that shown in detail in fig. 8, which consists in forming a recess or groove in the horizontal lip or flange $p$, and setting the said rubber ring into it.

Having thus fully described my invention, I claim—

The combination with the grooved India-rubber ring, the fasteners, and the vessel and its cover or lid, the whole arranged and combined substantially as herein set forth, of the flexible conductor pipe C, secured to the said cover or lid by the screw-joint D.

S. B. COX.

Witnesses:
WM. H. SLADE,
JOHN F. COX.